United States Patent
Cochran et al.

(10) Patent No.: US 6,374,254 B1
(45) Date of Patent: Apr. 16, 2002

(54) SCALABLE, DISTRIBUTED, ASYNCHRONOUS DATA COLLECTION MECHANISM

(75) Inventors: Stephen Thomas Cochran; Raghavendra Krishnamurthy; Michael Mallo; Vinod Thankappan Nair, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,626

(22) Filed: Jun. 30, 1999

(51) Int. Cl.⁷ .............................................. G06F 17/30
(52) U.S. Cl. ................. 707/102; 709/102; 709/201; 709/232
(58) Field of Search ................. 709/102, 103, 709/106, 201, 205, 206, 217–220, 223, 224, 225, 229, 310, 313, 319; 707/102; 712/28, 25, 201, 245

(56) References Cited

U.S. PATENT DOCUMENTS

| | | | | |
|---|---|---|---|---|
| 4,232,295 A | * | 11/1980 | McConnell ................. | 340/152 |
| 5,455,948 A | * | 10/1995 | Poole et al. ................. | 395/650 |
| 5,778,350 A | * | 7/1998 | Adams et al. ................. | 707/1 |
| 5,943,621 A | * | 8/1999 | Ho et al. ..................... | 455/456 |
| 6,195,628 B1 | * | 2/2001 | Blaauw et al. ................. | 703/16 |
| 6,282,175 B1 | * | 8/2001 | Steele et al. ................. | 370/254 |

* cited by examiner

Primary Examiner—Thomas Black
Assistant Examiner—Apu M Mofiz
(74) Attorney, Agent, or Firm—Marilyn Smith Dawkins; Bracewell & Patterson, L.L.P.

(57) ABSTRACT

The "scan" phase of a distributed data collection process is decoupled from upload of the return collection data, with the "scan" consisting merely of an infrequent profile push to configure autonomous scanners at the data collection endpoints. Distributed data collection is initiated by endpoints within the distributed network, which autonomously perform a scan and transmit a Collection Table of Contents (CTOC) data structure to a nearest available collector, then await a ready message from the collector. When ready to receive the return collection data, the collector signals the endpoint, which transfer the data collection in small packets to the collector. The collector stores the received data collection in persistent storage, then initiates collection to a higher collector or recipient in substantially the same manner as the endpoint. A routing manager controls the routing of data from endpoints through one or more collectors to the recipient. Scans for the data collection may thus be performed fully parallel, and upload of the collection data proceeds by direct channel under the control of the collectors. Bandwidth utilization for the data collection may thus be optimized for network loading by blackout periods and cooperation of the collectors with other distributed applications. The resulting distributed data collection mechanism is scalable, with large numbers of endpoints and large return collection data sizes being efficiently supported.

39 Claims, 6 Drawing Sheets

SCALABLE, DISTRIBUTED, ASYNCHRONOUS DATA COLLECTION MECHANISM

RELATED APPLICATIONS

The present invention is related to the subject matter of the following commonly assigned, copending United States patent applications: Ser. No. 09/345,627 entitled "A DATA COLLECTOR FOR USE IN A SCALABLE, DISTRIBUTED, ASYNCHRONOUS DATA COLLECTION MECHANISM" and filed Jun. 30, 1999; and Ser. No. 09/345,628 entitled "SCHEDULER FOR USE IN A SCALABLE, DISTRIBUTED, ASYNCHRONOUS DATA COLLECTION MECHANISM" and filed Jun. 30, 1999. The content of the above-identified applications is incorporated herein by reference.

BACKGROUND OF THE INVENTION

1. Technical Field

The present invention generally relates to collection of data from nodes in distributed networks and in particular to asynchronous collection of large blocks of data from distributed network nodes. Still more particularly, the present invention relates to a scalable, distributed data collection mechanism which efficiently supports large numbers of data collection endpoints and large return collection data sizes with optimized bandwidth utilization.

2. Description of the Related Art

Distributed applications which operate across a plurality of systems frequently require collection of data from the member systems. A distributed inventory management application, for example, must periodically collect inventory data for compilation from constituent systems tracking local inventory in order to accurately serve inventory requests.

Large deployments of distributed applications may include very large numbers of systems (e.g., than 10,000) generating data. Even if the amount of data collected from each system is relatively small, this may result in large return data flows. For instance, if each system within a 20,000 node distributed application generates only 50 KB of data for collection, the total data size is still approximately 1,000 MB.

Current synchronous approaches to data collection in distributed applications typically follow a "scan" methodology illustrated in FIG. 5. In this approach, a centralized data collector (or "scan initiator") 502 initiates the data collection by transmitting a set of instructions to each node or member system 504a–504n through one or more intermediate systems 506, which are typically little more than a relay providing communications between the central data collector 502 and the member systems 504a–504n. The central data collector 502 must determine hardware and software configuration information for the member systems 504a–504n, request the desired data from the member systems 504a–504n, and receive return data via the intermediate system(s) 506. The data received from the member systems 504a–504n is then collated and converted, if necessary, and forwarded to a relational interface module (RIM) 508, which serves as an interface for a relational database management system (RDBMS).

In addition to not being readily scalable, this approach generates substantial serial bottlenecks on both the scan and return side. Even with batching, the number of member systems which may be concurrently scanned must be limited to approximately 100 in order to limit memory usage. The approach also limits exploitable parallelism. Where a five minute scan is required, 20,000 nodes could all be scanned in just five minutes if the scans could be performed fully parallel. Even in batches of 100, the five minute scans would require 1,000 minutes to complete. The combination of the return data flow bottleneck and the loss of scan parallelism creates a very large latency, which is highly visible to the user(s) of the member systems.

Current approaches to data collection in distributed applications also employ Common Object Request Broker Architecture (CORBA) method parameters for returning results to the scan initiator 502. This is inefficient for larger data sizes, which are likely to be required in data collection for certain information types such inventory or retail customer point-of-sale data.

Still another problem with the existing approach to data collection is that nodes from which data must be collected may be mobile systems or systems which may be shut down by the user. As a result, certain nodes may not be accessible to the scan initiator 502 when data collection is initiated.

It would be desirable, therefore, to provide a scalable, efficient data collection mechanism for a distributed environment having a large number of nodes and transferring large blocks of data. It would further be advantageous for the system to accommodate data collection from nodes which may be periodically or intermittently inaccessible to the collection point.

SUMMARY OF THE INVENTION

It is therefore one object of the present invention to provide improved collection of data from nodes in distributed networks.

It is another object of the present invention to provide asynchronous collection of large blocks of data from distributed network nodes.

It is yet another object of the present invention to provide a scalable, distributed data collection mechanism which efficiently supports large numbers of data collection endpoints and large return collection data sizes with optimized network bandwidth utilization.

The foregoing objects are achieved as is now described. The "scan" phase of a distributed data collection process is decoupled from upload of the return collection data, with the "scan" consisting merely of an infrequent profile push to configure autonomous scanners at the data collection endpoints. Distributed data collection is initiated by endpoints within the distributed network, which autonomously perform a scan and transmit a Collection Table of Contents (CTOC) data structure to a nearest available collector, then await a ready message from the collector. When ready to receive the return collection data, the collector signals the endpoint, which transfers the data collection in small packets to the collector. The collector stores the received data collection in persistent storage, then initiates collection to a higher collector or recipient in substantially the same manner as the endpoint. A routing manager controls the routing of data from endpoints through one or more collectors to the recipient. Scans for the data collection may thus be performed fully parallel, and upload of the collection data proceeds by direct channel under the control of the collectors. Bandwidth utilization for the data collection may thus be optimized for network loading by blackout periods and cooperation of the collectors with other distributed applications. The resulting distributed data collection mechanism is scalable, with large numbers of endpoints and large return collection data sizes being efficiently supported.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
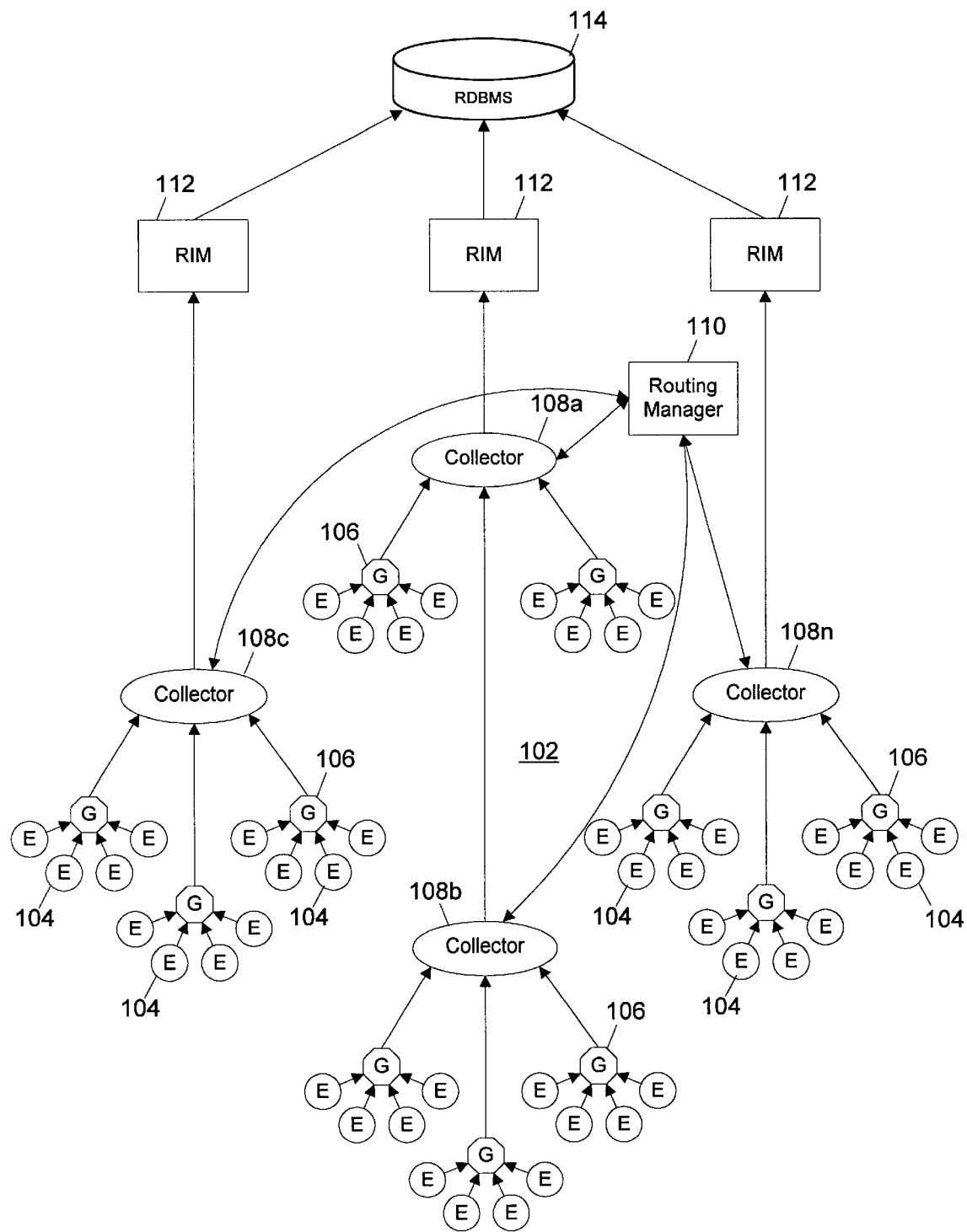
FIGS. 1A–1B depict diagrams of a distributed data collection mechanism in accordance with a preferred embodiment of the present invention.
Figure 1B:
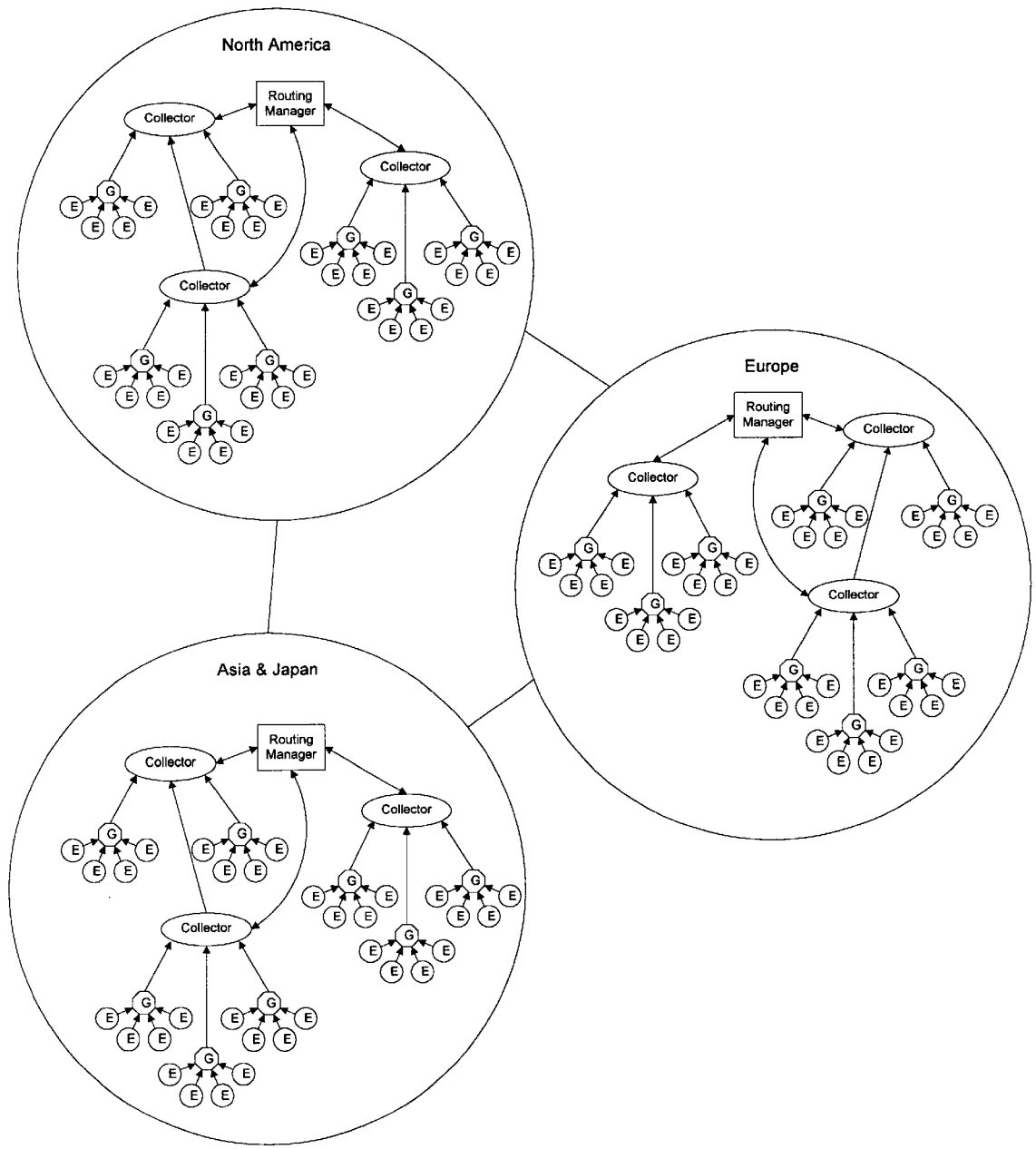

With reference now to the figures, and in particular with reference to FIGS. 1A and 1B, diagrams of a distributed data collection mechanism in accordance with a preferred embodiment of the present invention are depicted. Distributed data collection mechanism 102 is implemented within a network of data processing systems including endpoints ("E") 104 coupled via gateways ("G") 106 to collectors 108a–108n.

The network of data processing systems in which distributed data collection mechanism 102 is implemented may be either homogeneous or heterogeneous, and may form a local area network (LAN) or include two or more LANs connected to form a wide area network (WAN) or global area network. The network of data processing systems preferably includes an environment for running distributed applications, such as Tivoli Management Environment (TME) available from Tivoli Systems, Inc. of Austin, Tex.

Endpoints 104, which may also be referred to as "sources," are the systems from which data is to be collected. Gateways 106 are systems which facilitate communications between endpoints 104 and collectors 108a–108n and/or routing manager 110. Recipients are objects or processes that receive collected data, and may be collectors 108a–108n, relational interface modules ("RIMs") 112, or any object designed to collect such data from a downstream collector. RIMs 112 depicted in the exemplary embodiment are not the only possible destination for collected data.

Collectors 108a–108n are objects or processes which perform the task of data collection from a fixed set of endpoints 104. The primary objective for collectors 108a–108n is to collect data from all corresponding endpoints 104 assigned to route data to the respective collector 108a–108n, and store the received data in a persistent depot until another collector or the ultimate recipient is ready to receive the collected data. Data is collected based on certain characteristics such as priority, availability of the source (endpoint 104 or collector 108a–108n), and bandwidth usage. A collector 108a–108n may collect data from endpoints 104 or from another collector (e.g., collectors 108a and 108n in the example depicted). A collector 108a–108n may transfer data to another collector or to the recipient of the collection.

Routing manager 110 is a centralized module which manages collectors 108a–108n and the routes from endpoints 104 through collectors 108a–108n to the recipients of the collection, relational interface modules ("RIMs") 112 and relational database management system ("RDBMS") 114. The primary function of routing manager 110 is to manage the deployment of collectors 108a–108n and maintain the routes from endpoints 104 through collectors 108a–108n to the recipients of the collection. Each routing manager 110 will service several collectors 108a–108n, although for scalability an enterprise may include several routing managers 110. FIG. 1B illustrates one circumstance under which multiple routing managers would be desirable: where the data collection includes networks spanning multiple continents.

Collectors 108a–108n, routing manager 110, RIMs 112 and RDBMS 114 may all run on a single system or may be distributed among a plurality of systems. Although the exemplary embodiment depicts a one-to-one correspondence between collectors 108a–108n and RIMs 112, multiple collectors 108a–108n may be coupled to a single RIM 112, and a single collector 108a–108n may be coupled to multiple RIMs 112 for separate databases. Endpoints 104 may be continuously coupled to the network hosting distributed data collection mechanism 102, or they may be mobile systems only occasionally connected to the network. Endpoints 104 may be continuously powered on or may have periods during which they are turned off.

Figure 2A:
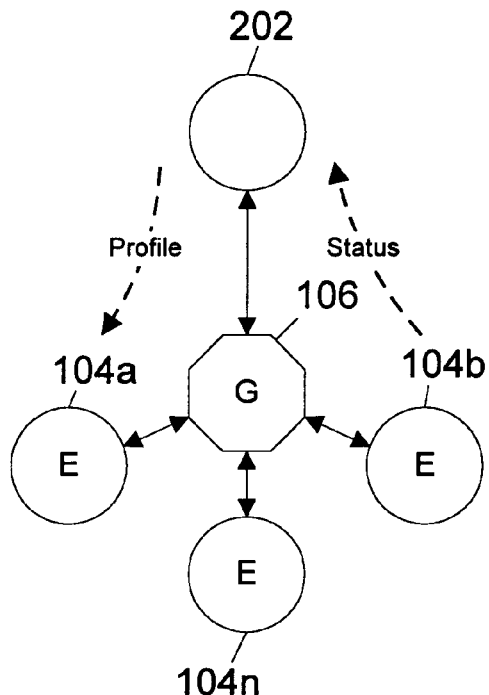
FIGS. 2A–2B are diagrams of portions of the distributed data collection mechanism relevant to different phases of the data collection process in accordance with a preferred embodiment of the present invention.
Figure 2B:
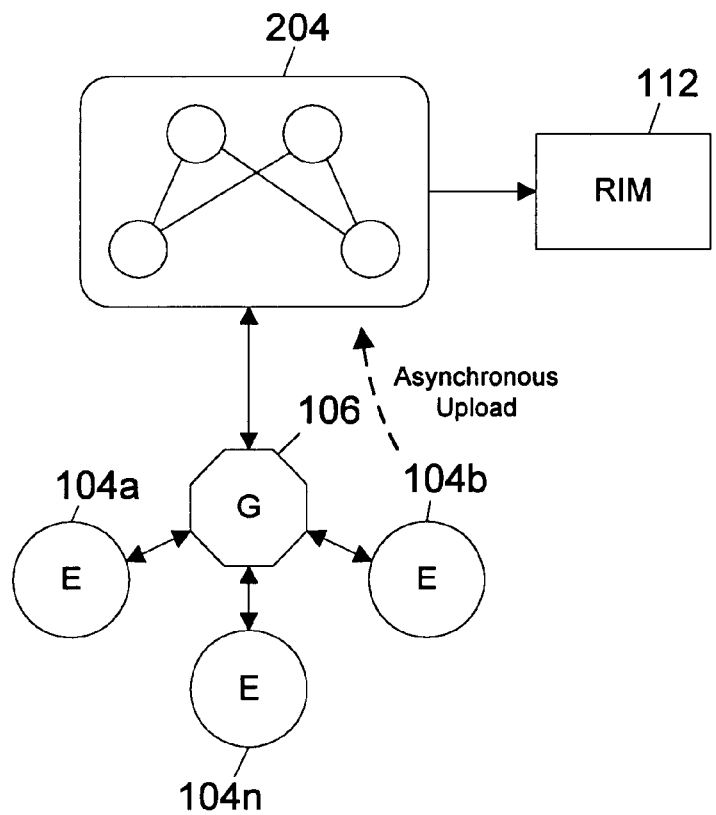

Referring to FIGS. 2A and 2B, diagrams of portions of the distributed data collection mechanism relevant to different phases of the data collection process in accordance with a preferred embodiment of the present invention are illustrated. In the present invention, the "scan" phase of the data collection process is decoupled from the gathering of return results. FIG. 2A illustrates the "scan" phase of the data collection process. In the present invention, each endpoint 104a–104n includes an autonomous scanner, allowing scans to proceed fully parallel. During the "scan" phase, a central "scan initiator" module 202 merely performs a profile push to the endpoints 104a–104n without waiting for return data. Some status data may be returned by endpoints 104a–104n to central module 202, but the data to be collected is not returned to central module 202 in response to the profile push. The actual scanning of an endpoint for collection data may be initiated either centrally or autonomously at each endpoint 104a–104n.

As illustrated in FIG. 2B, "return" or collection data (the data being collected) is asynchronously uploaded by individual endpoints 104a–104n to a collection network 204, consisting of collectors associated with endpoints 104a–104n, which routes the data to RIM 112. Transfer of the collection data is thus initiated by the endpoints 104a–104n rather than a centralized module 202. Stated differently, the actual data collection is initiated from the bottom up rather than from the top down.

The profile pushes from central module 202 are infrequent, needed only to set or change the scanner configuration at endpoints 104a–104n. Scanners may be set to run automatically on a daily/weekly schedule or on some other schedule, or in response to an event (including a synchronous scan request from the user), or on boot-up. Scan data is subsequently queued for asynchronous collection.

In its simplest form, collection network 204 may simply be an upcall-collector at each gateway 106 within the distributed data collection mechanism 102, with uploads from endpoints 104a–104n routed from the gateway 106 directly to the RIM 112. However, this implementation may result in a potentially large load on gateway 106. For a gateway 106 servicing 1,000 endpoints 104a–104n, each generating 50K of collection data, the total load on gateway 106 will be 50 MB. Data collection in this case will be competing with data distributions on gateway 106 in which data is flowing downstream.

Another drawback with this implementation is that gateways are not generally RIM hosts, which means that unless a custom RIM method is implemented, data flowing from gateway 106 to RIM 112 will be based on CORBA method parameters. Furthermore, wire-transfer overhead is potentially added to the RIM write, in addition to RIM latency. This implementation also provided less control over return data path and less coordination between RIM writers.

A more scalable solution is provided where collection network 204 is implemented with a configurable topology, using collectors nodes instead of simple upcall-collectors as basic elements. Collector nodes can be connected together to form a collection network topology, and can provide additional functionality such as depoting (caching), bandwidth control, and transfer scheduling. Deployment of collector nodes is controlled by the customer, so that the user may choose a simple topology if that is sufficient or, for larger deployments, add additional managed collector nodes to the topology to scale up the amount of data which can be buffered and improve response time visible to endpoints 104a–104n for queuing collection requests. Since collector nodes are not hard coded to gateways, application-specific topology customization becomes possible for, e.g., strategic placement of destination collectors on the RIM host for inventory so that wire-transfer overhead in the RIM object call is eliminated. The topology may be tailored to a specific networks, modified with network changes (addition of nodes), or dynamically modified based on network loading.

Each collector within collection network 204 has a list of endpoints 104a–104n and other collectors with which it may communicate, with the list being maintained by the routing manager. In uploads to a higher collector, each collector behaves substantially like endpoints 104a–104n.

Figure 3:
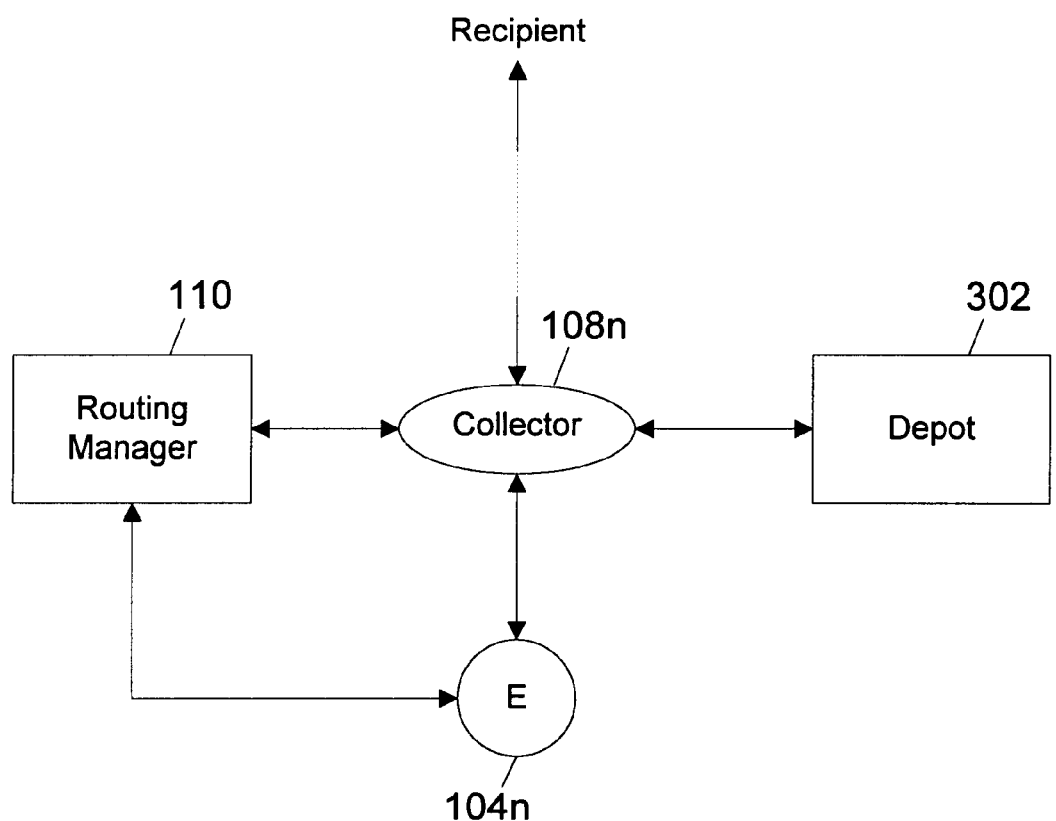
FIG. 3 is a diagram of components of a distributed data collection mechanism employed in a collection process in accordance with a preferred embodiment of the present invention.

With reference now to FIG. 3, a diagram of components of a distributed data collection mechanism employed in a collection process in accordance with a preferred embodiment of the present invention is depicted. A "collection," or an upload of return/collection data from a source towards a recipient, is initiated by endpoint 104n. Whenever endpoint 104n wishes to initiate a collection, endpoint 104n contacts the routing manager 110 to which it is assigned to determine the nearest available collector 108n. Routing manager 110 can determine the location of the nearest available collector 108n, which may take into account the priority of the collection, the utilization of the network by other processes, the availability of endpoint 104n.

The collection or routing manager 110 maintains a graph-based representation of the collection network, in which collectors are modelled as nodes in the graph and permitted connections are represented by weighted edges. This representation is employed to calculate the optimum path for data and in each hop calculation. Multiple collection managers may exist in the enterprise, with one collection manager per region for multiple regions. Data crossing regions boundaries will do so along WAN-entry points which may be specified to the collection managers.

Endpoint 104n then initiates a collection by transmitting to the collector 108n a Collection Table of Contents (CTOC), a data structure including information about the collection such as source, recipient, priority, time window, and collection identifier (once assigned). The first time a CTOC is submitted to a collector 108n, the CTOC will receive a unique collection identifier utilized to track the progress of the collection in the network.

Upon receiving the CTOC from endpoint 104n, the collector 108n will queue the CTOC for handling. When collector 108n is ready to receive the collection data, collector 108n initiates and upload by informing endpoint 104n that it (collector 108n) is ready. Upon receipt of this ready message, endpoint 104n begins transmitting the collection data to collector 108n in small packets, which collector 108n stores in persistent storage (depot 302).

Once the collection data received from endpoint 104n has all been stored by collector 108n, collector 108n sends a message containing the CTOC to either another collector or the recipient. The collection data remains within collector 108n until requested by a higher level collector or the recipient. Once the upstream collector or recipient is ready to receive the collection data, collector 108n transfers the collection data in the same manner in which it collected the data from endpoint 104n or a downstream collector.

In case of collection failure, a retry mechanism on the upstream collector will re-attempt to upload the collection data. If a collection is broken off in the middle of receiving the collection data, collector 108n attempts to receive the remaining data after a short duration, employing a checkpoint restart from the point at which the collection was interrupted. The sender of the data does not delete any part of the collection data until the entire collection data has been successfully transferred upstream.

Upload of collection data to collectors may be managed to control network loading, and may cooperate with other distributed applications to conserve bandwidth utilization while optimizing the amount of bandwidth employed for collection. If there exists a critical section of the network where collection needs to be controlled, a collector may be placed at the end where data is being received. That collector may then be "turned off" or prohibited from transmitting a ready message to an endpoint or downstream collector during certain blackout periods to disable collection. The network may thus impose restrictions on when data may be transferred across certain critical network facilities in order to conserve bandwidth usage.

Figure 4:
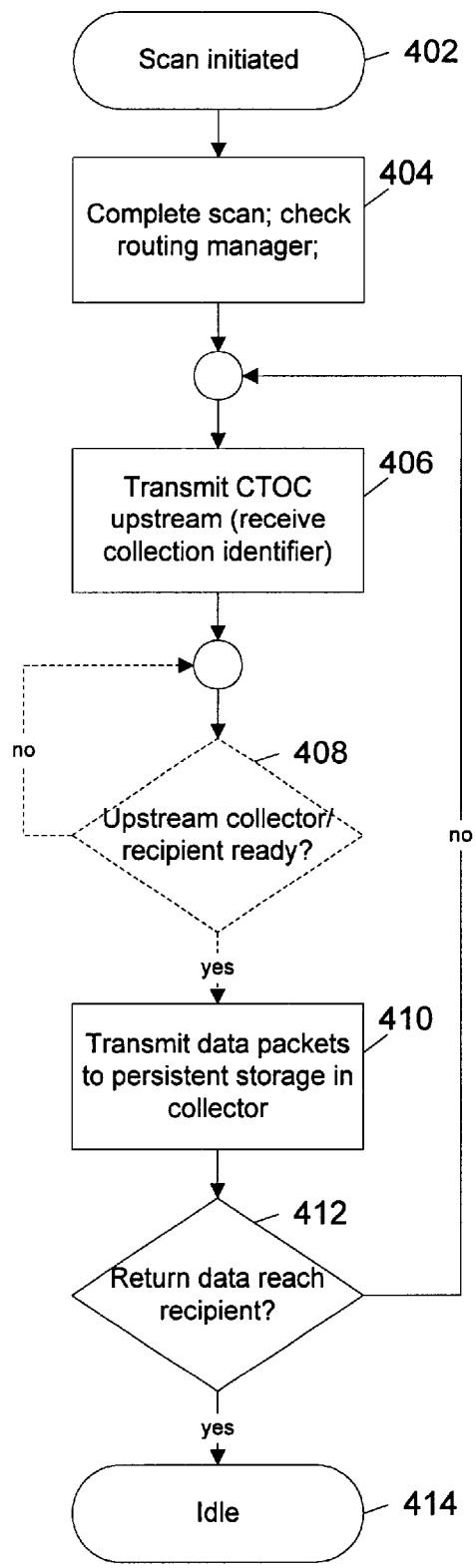
FIG. 4 is a high level flowchart for a process of distributed data collection in accordance with a preferred embodiment of the present invention.
Figure 5:
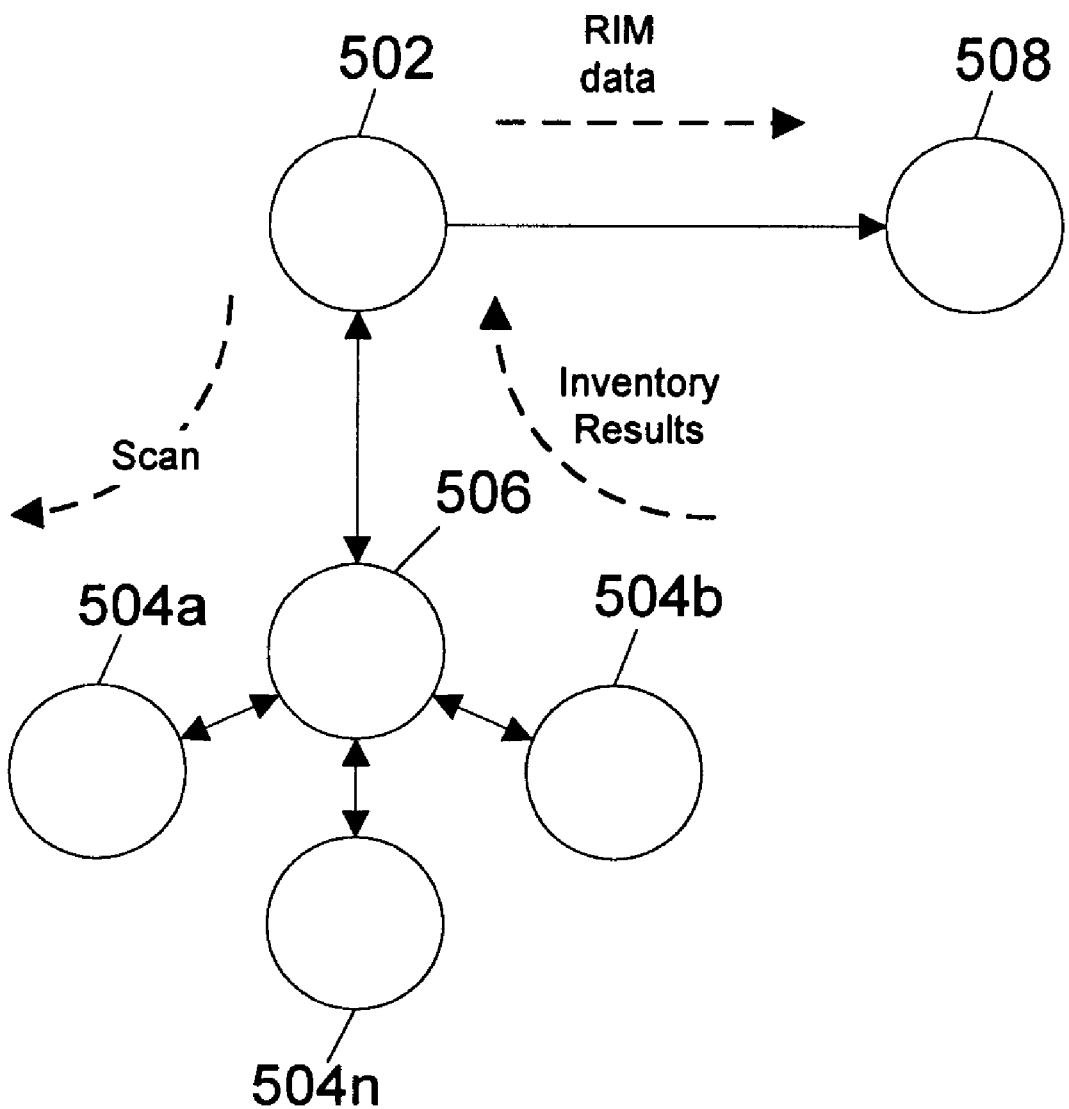
FIG. 5 is a diagram of a distributed data collection process in accordance with the known art.

Referring to FIG. 4, a high level flowchart for a process of distributed data collection in accordance with a preferred embodiment of the present invention is illustrated. The process begins at step 402, which depicts initiating an autonomous scan for collection data at an endpoint, where the scan was previously configured by a profile push from a central module. The process then passes to step 404, which illustrates completing the scan, and checking with a centralized routing module for the endpoint to determine which collector is to receive collection data identified within the endpoint.

The process next passes to step 406, which depicts transmitting a collection table of contents for the collection data identified within the endpoint upstream, to the collector in this case, or to a higher level collector to a recipient in the case of a collector as described below. If this is the first time the collection table of contents has been transmitted (i.e., from the original endpoint to a lower level collector), then a collection identifier for the collection data is received from the collector. The process then passes to step 408, which depicts a determination of whether the collector to receive the collection data is ready. If not, the process continually returns to step 408 to await a ready signal from the upstream collector or recipient. The ready signal may be transmitted by the upstream collector based on priority of the collection data, availablity of the endpoint (activation window), and pending data transfers at the upstream collector and associated priorities/activation windows.

Step 408 is not intended to imply that some process within the endpoint or downstream collector actually idles while waiting for the upstream collector to be ready to receive the collection data. In practice, the process that initiated the data collection terminates. The upstream collector initiates a process to effect the data transfer within the endpoint or downstream collector at any point after receiving the CTOC. The system relies on the fact that no endpoint need be waiting for an upstream collector to collect data, but is instead asynchronous, in order to improve data collection efficiency.

Once a ready signal is received from the upstream collector or recipient, the process proceeds instead to step 410, which depicts transmitting the collection data in the form of data packets to the upstream collector or recipient until all of the collection data has been transferred. The collection data may then be optionally deleted from the endpoint or lower level collector, or may alternatively be retained until confirmation of receipt of the collection data is transmitted by the intended recipient.

From step 410, the process passes next to step 412, which illustrates a determination of whether the collection data has reached the intended recipient, identified within the collection table of contents. If not, the process returns to step 406, and the collection table of contents is transmitted by the collector to the next higher collector or the recipient, initiating a data collection transfer to be performed when that portion of the distributed data collection mechanism is ready to receive the collection data. The process thus repeats itself for each collector level between the original endpoint and the intended recipient. Once the collection data reaches the intended Precipient, the process proceeds to step 414, which depicts the process becoming idle until a subsequent data collection process is initiated.

The present invention addresses the problem of collecting data residing on individual systems within a networked enterprise. Both the number of individual systems and the size of the data being transferred from those systems may be very large without substantially degrading the efficiency of the distributed data collection mechanism of the present invention.

With the present invention, the scan bottleneck associated with conventional distributed data collection processes is eliminated. The RIM bottleneck, while still present, is less visible to the user and the endpoints since the collection network employed matches data rates with available bandwidth and provides buffering of the data transfers.

The collection network employed in the present invention utilizes a distributed hierarchy of mid-level collector nodes on the input side to provide a low-latency interface for servicing endpoint requests. On the output side, the collection network streams collected data into the RIM host(s) at the best possible rate, exploiting parallel RIM hosts when available. The collector nodes maintain internale depots for matching high data rates at input to slow output, and provide transfer scheduling and network bandwidth management.

The present invention provides an asynchronous collection mechanism in which data collection is controlled by the individual collector. Data is transferred utilizing a direct channel and is stored in depots established to hold collected data. The data collection mechanism allows check-point restarts, blackout windows, and bandwidth utilization control.

The present invention may be utilized in a distributed collection network in which the topology is configurable and may be dynamically modified at run time based on loading conditions by specifying routing for particular packets of collection data according to regional traffic on all alternative paths between the source and recipient. Data collection autonomously originates with data generation endpoints and is asynchronously timed, within an activation window specified by the endpoints, based on local conditions within an upstream collector for a next immediate hop. Scheduling of collection data hops is performed locally without global timing constraints.

The present invention is well-suited for data collection from mobile endpoints. The user of the mobile endpoint may trigger an autonomous scan for collection data within the mobile endpoint by logging on to a network. The mobile system formulates a CTOC for the collection data, specifying an activation window with, perhaps, some input from the user regarding how long the user intends to remain logged onto the network. The priority for the CTOC may also be set based on whether the endpoint is mobile and/or intermittently unavailable or always on and always connected. The routing for the next data hop is optimized by a central collection routing manager for local traffic and available alternative paths to the intended recipient, but scheduling is based on local conditions without global timing controls.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of establishing a distributed data collection mechanism, comprising:

providing an endpoint from which data is to be collected;

providing a collector to receive collection data from the endpoint; and configuring the endpoint to initiate data collection by transmitting a data structure to the collector.

2. The method of claim 1, further comprising:
providing an autonomous scanner within the endpoint configured to scan the endpoint for collection data upon occurrence of a predetermined event.

3. The method of claim 2, wherein the step of providing an endpoint from which data is to be collected further comprises:
providing a plurality of endpoints, wherein each endpoint includes an autonomous scanner.

4. The method of claim 3, wherein the step of configuring the endpoint to initiate data collection by transmitting a data structure to the collector further comprises:
configuring each of the plurality of endpoints to initiate data collection by transmitting a data structure to the collector, wherein each of the plurality of endpoints is configured to upload collection data to the collector.

5. The method of claim 4, wherein the step of providing a collector to receive collection data from the endpoint further comprises:
providing a plurality of collectors to receive collection data from the plurality of endpoints, wherein the plurality of endpoints is logically divided into groups with each group of endpoints configured to upload collection data to a different collector within the plurality of collectors.

6. The method of claim 5, further comprising:
providing a routing manager specifying, for each endpoint within the plurality of endpoints, a collector within the plurality of collectors to which the respective endpoint uploads collection data.

7. A method of distributed data collection, comprising:
initiating data collection utilizing an endpoint from which data is to be collected by transmitting a data structure from the endpoint to a collector designated to receive collection data from the endpoint; and
initiating upload of the collection data from the endpoint to the collector by transmitting a ready signal from the collector to the endpoint.

8. The method of claim 7, wherein the step of initiating data collection utilizing an endpoint from which data is to be collected by transmitting a data structure from the endpoint to a collector designated to receive collection data from the endpoint further comprises:
transmitting a collection table of contents containing a source, a recipient, a priority, and a time window from the endpoint to the collector.

9. The method of claim 8, further comprising:
responsive to transmitting the collection table of contents from the endpoint to the collector, receiving a collection identifier for the collection data; and
storing the collection identifier within the collection table of contents.

10. The method of claim 7, wherein the step of initiating upload of the collection data from the endpoint to the collector by transmitting a ready signal from the collector to the endpoint further comprises:
transmitting the ready signal to the endpoint when the collector is ready to receive the collection data.

11. The method of claim 7, where in the step of initiating upload of the collection data from the endpoint to the collector by transmitting a ready signal from the collector to the endpoint further comprises:
transmitting the ready signal based on a priority of the collection data, an availability of the endpoint, a number of pending collection data uploads to the collector from other endpoints, and network traffic for the collector.

12. The method of claim 7, further comprising:
checking a routing manager for the endpoint to determine to which collector among a plurality of collectors the collection data is to be directed.

13. The method of claim 7, further comprising:
responsive to receiving the ready signal from the collector at the endpoint, transmitting the collection data from the endpoint to the collector in packets; and
storing the collection data in persistent storage associated with the collector.

14. A system for establishing a distributed data collection mechanism, comprising:
an endpoint from which data is to be collected;
a collector to receive collection data from the endpoint, wherein the endpoint is configured to initiate data collection by transmitting a data structure to the collector.

15. The system of claim 14, further comprising:
an autonomous scanner within the endpoint configured to scan the endpoint for collection data upon occurrence of a predetermined event.

16. The system of claim 15, further comprising:
a plurality of endpoints, wherein each endpoint includes an autonomous scanner.

17. The system of claim 16, wherein each of the plurality of endpoints initiate data collection by transmitting a data structure to the collector and upload collection data to the collector.

18. The system of claim 16, further comprising:
a plurality of collectors to receive collection data from the plurality of endpoints, wherein the plurality of endpoints is logically divided into groups with each group of endpoints configured to upload collection data to a different collector within the plurality of collectors.

19. The system of claim 18, further comprising:
a routing manager specifying, for each endpoint within the plurality of endpoints, a collector within the plurality of collectors to which the respective endpoint uploads collection data.

20. A system for distributed data collection, comprising:
means for initiating data collection utilizing an endpoint from which data is to be collected by transmitting a data structure from the endpoint to a collector designated to receive collection data from the endpoint; and
means for initiating upload of the collection data from the endpoint to the collector by transmitting a ready signal from the collector to the endpoint.

21. The system of claim 20, wherein the means for initiating data collection utilizing an endpoint from which data is to be collected by transmitting a data structure from the endpoint to a collector designated to receive collection data from the endpoint further comprises:
means for transmitting a collection table of contents containing a source, a recipient, a priority, and a time window from the endpoint to the collector.

22. The system of claim 21, further comprising:
means, responsive to transmitting the collection table of contents from the endpoint to the collector, for receiving a collection identifier for the collection data; and
means for storing the collection identifier within the collection table of contents.

23. The system of claim 20, wherein the means for initiating upload of the collection data from the endpoint to the collector by transmitting a ready signal from the collector to the endpoint further comprises:

means for transmitting the ready signal to the endpoint when the collector is ready to receive the collection data.

24. The system of claim 23, wherein the means for initiating upload of the collection data from the endpoint to the collector by transmitting a ready signal from the collector to the endpoint further comprises:

means for transmitting the ready signal based on a priority of the collection data, an availability of the endpoint, a number of pending collection data uploads to the collector from other endpoints, and network traffic for the collector.

25. The system of claim 20, further comprising:

means for checking a routing manager for the endpoint to determine to which collector among a plurality of collectors the collection data is to be directed.

26. The system of claim 20, further comprising:

means, responsive to receiving the ready signal from the collector at the endpoint, for transmitting the collection data from the endpoint to the collector in packets; and means for storing the collection data in persistent storage associated with the collector.

27. A computer program product for establishing a distributed data collection mechanism, comprising:

instructions for providing an endpoint from which data is to be collected;

instructions for providing a collector to receive collection data from the endpoint; and instructions for configuring the endpoint to initiate data collection by transmitting a data structure to the collector.

28. The computer program product of claim 27, further comprising:

instructions for providing an autonomous scanner within the endpoint configured to scan the endpoint for collection data upon occurrence of a predetermined event.

29. The computer program product of claim 28, wherein the instructions for providing an endpoint from which data is to be collected further comprise:

instructions for providing a plurality of endpoints, wherein each endpoint includes an autonomous scanner.

30. The computer program product of claim 29, wherein the instructions for configuring the endpoint to initiate data collection by transmitting a data structure to the collector further comprise:

instructions for configuring each of the plurality of endpoints to initiate data collection by transmitting a data structure to the collector, wherein each of the plurality of endpoints is configured to upload collection data to the collector.

31. The computer program product of claim 30, wherein the instructions for providing a collector to receive collection data from the endpoint further comprise:

instructions for providing a plurality of collectors to receive collection data from the plurality of endpoints, wherein the plurality of endpoints is logically divided into groups with each group of endpoints configured to upload collection data to a different collector within the plurality of collectors.

32. The computer program product of claim 31, further comprising:

instructions for providing a routing manager specifying, for each endpoint within the plurality of endpoints, a collector within the plurality of collectors to which the respective endpoint uploads collection data.

33. A computer program product of distributed data collection, comprising:

instructions for initiating data collection utilizing an endpoint from which data is to be collected by transmitting a data structure from the endpoint to a collector designated to receive collection data from the endpoint; and instructions for initiating upload of the collection data from the endpoint to the collector by transmitting a ready signal from the collector to the endpoint.

34. The computer program product of claim 33, wherein the instructions for initiating data collection utilizing an endpoint from which data is to be collected by transmitting a data structure from the endpoint to a collector designated to receive collection data from the endpoint further comprise:

instructions for transmitting a collection table of contents containing a source, a recipient, a priority, and a time window from the endpoint to the collector.

35. The computer program product of claim 34, further comprising:

instructions, responsive to transmitting the collection table of contents from the endpoint to the collector, for receiving a collection identifier for the collection data; and instructions for storing the collection identifier within the collection table of contents.

36. The computer program product of claim 33, wherein the instructions for initiating upload of the collection data from the endpoint to the collector by transmitting a ready signal from the collector to the endpoint further comprise:

instructions for transmitting the ready signal to the endpoint when the collector is ready to receive the collection data.

37. The computer program product of claim 33, wherein the instructions for initiating upload of the collection data from the endpoint to the collector by transmitting a ready signal from the collector to the endpoint further comprise:

instructions for transmitting the ready signal based on a priority of the collection data, an availability of the endpoint, a number of pending collection data uploads to the collector from other endpoints, and network traffic for the collector.

38. The computer program product of claim 33, further comprising:

instructions for checking a routing manager for the endpoint to determine to which collector among a plurality of collectors the collection data is to be directed.

39. The computer program product of claim 33, further comprising:

instructions, responsive to receiving the ready signal from the collector at the endpoint, for transmitting the collection data from the endpoint to the collector in packets; and instructions for storing the collection data in persistent storage associated with the collector.

* * * * *